United States Patent [19]

Barr et al.

[11] Patent Number: 4,947,418
[45] Date of Patent: Aug. 7, 1990

[54] EMERGENCY TRAUMA BOARD

[76] Inventors: Stephen J. Barr; Melody T. Barr, both of Rte. 1, Box 98, both of Troy, Ill. 62294

[21] Appl. No.: 313,066

[22] Filed: Feb. 21, 1989

[51] Int. Cl.⁵ .......................... G03B 1/42; G03B 1/44; A61G 3/02; A61G 1/01
[52] U.S. Cl. .................................... 378/177; 378/208; 5/60; 5/82 R
[58] Field of Search ...................... 5/61, 62, 60, 66, 82, 5/82 R, 81 B, 86, 80; 378/177, 208, 178, 180; 128/870; 269/322, 328

[56] References Cited

U.S. PATENT DOCUMENTS

| | | | |
|---|---|---|---|
| 2,503,314 | 4/1950 | Atwood | 5/82 |
| 2,565,761 | 8/1951 | Dean | 5/86 |
| 2,681,839 | 6/1954 | Limbach | 311/2 |
| 2,989,634 | 6/1961 | Ould et al. | 250/58 |
| 3,088,128 | 5/1963 | Waddington | 5/82 |
| 3,099,020 | 7/1963 | Garfield et al. | 5/81 |
| 3,188,659 | 6/1965 | Lundgren et al. | 5/86 |
| 3,648,305 | 3/1972 | Ersek | 5/82 |
| 3,786,523 | 1/1974 | Sele | 5/81 |
| 4,137,581 | 2/1979 | Daly | 5/82 |
| 4,193,148 | 3/1980 | Rush | 5/86 |

Primary Examiner—Janice A. Howell
Assistant Examiner—Don Wong
Attorney, Agent, or Firm—Richard G. Heywood

[57] ABSTRACT

An emergency trauma board having dual, spaced apart main frames, one main frame having a rigid transparent patient support panel with X-ray holding means on a underside thereof, the other main frame having a fluid permeable patient support panel with an underlying imperforate fluid transfer barrier, patient restraints for immobilizing a patient on one of said panels, and other means accommodating hinging movement of one panel from a closed position within its main frame to an angular open position and supporting such one panel in a braced condition.

31 Claims, 4 Drawing Sheets

EMERGENCY TRAUMA BOARD

BACKGROUND OF THE INVENTION

1. Field of Invention

The present invention pertains generally to patient handling apparatus, and more particularly to an emergency trauma board for immobilizing traumatized victims during emergency transportation and through hospital emergency room procedures for diagnosis and treatment.

2. Description of the Prior Art

In the emergency transportation of victims of all sorts of accidents or sickness, such victims or patients are usually initially attended by paramedics or ambulance crews and placed on a conventional stretcher or mobile bed, and they are then generally transferred to a hospital emergency room examining table and again to an X-ray table and back again in a series of handling steps during a period when the nature and extent of injury may not have been determined and any movement of the patient may aggravate such injury. Although the immobilization of a trauma victim at the accident scene is generally recognized as a highly desirable expedient, it should also be recognized that the high morbidity rate occurring in hospital emergency rooms and trauma centers may be contributed to by the repeated transfer of victims through various diagnostic procedures rather than maintaining such victims in an immobilized condition throughout. A typical example of such adverse handling occurs during present radiographic (X-ray) procedures which, in a typical major trauma situation, calls for multiple plates of the cervical spine (lateral), chest and pelvic regions and/or head and neck. Most hospitals, clinics and trauma centers employ a separate radiographic department for almost all X-ray procedures, which requires patient transport from emergency and transfer or handling to accommodate the necessary X-ray plates. Portable X-ray equipment is increasingly being used in emergency room procedures, but still requires patient movement and/or re-positioning of X-ray equipment for separate plates whereas X-ray examination in situ will produce optimum evaluation in time and thoroughness with minimum risk to the patient.

In the past, various stretchers and like patient transfer apparatus have been proposed for immobilizing and transferring trauma victims and for lifting and handling invalids or the like with a minimum of body movement, as taught by U.S. Pat. Nos. 2,503,314; 2,565,761; 3,088,128; 3,097,020; 3,786,523 and 4,137,581, but none of these devices provide dual support surfaces for selectively accommodating victims with different types of injury or sickness requiring different emergency treatment. Similarly, other apparatus has been designed to minimize the transfer or handling of accident victims or the like during hospital emergency procedures of examination and X-ray, in the form of mobile X-ray transparent transfer tables as shown in U.S. Pat. Nos. 2,681,839; 3,188,659 and 4,193,148, but these do not teach a multiple purpose trauma board accommodating rapid sequential X-ray techniques in the critical examination areas while maintaining the victim immobilized throughout this process. Furthermore, such prior art does not take into account the need to immobilize a large number of other types of trauma victims through emergency room procedures for diagnosis and treatment, such as electrical shock, burn, heat stroke, cardiac arrest, chemical contamination or irradiation and like cases. Nausea, vertigo and vomiting are material factors in many of these cases and should also be taken under consideration in emergency patient handling and transfer situations.

SUMMARY OF THE INVENTION

Briefly summarized, the invention comprises an emergency trauma board apparatus having a dual main frame and outwardly facing patient support surfaces for alternative use in conveying sick or injured persons under emergency situations and/or keeping such victims immobilized during hospital room emergency diagnosis and treatment, one support surface being a transparent panel accommodating X-ray procedures, and the other support surface being of a fluid permeable nature and having an underlying imperforate fluid holding barrier permitting fluid irrigation procedures, and one of the support surfaces being movable from a horizontal position to an angular position for treatment of nausea.

A principal object of the present invention is to provide an emergency trauma board for use in the transportation of sick or injured patients to emergency treatment facilities, and which facilitates emergency room procedures without transferring the patient from this apparatus.

Another object is to provide an emergency trauma board for immobilizing sick or injured persons from a remote accident site through emergency room diagnostic and treatment procedures, including X-ray, burn treatment, chemical decontamination, irradiation cleansing and like emergency treatment.

Another object is to provide a trauma board apparatus useful for immobilizing victims having all types of injury or illness conditions during emergency treatment and without moving the patient from this apparatus for such treatment.

Still another object is to provide an emergency conveyance apparatus that can be used in lieu of numerous other patient support stretchers, X-ray tables, gurneys and tables presently used in hospital emergency rooms, and which is relatively lightweight, strong and effective in the positioning and restraint of patients throughout emergency diagnostic and treatment procedures.

These and still other objects and advantages will become more apparent hereinafter.

DESCRIPTION OF THE DRAWINGS

The invention is embodied in the structure and the parts and combinations of parts hereinafter described and claimed. In the accompanying drawings which form a part of the specification, and wherein like numerals refer to like parts wherever they occur:

DESCRIPTION OF THE PREFERRED EMBODIMENT

The emergency trauma board of the present invention provides dual outwardly facing support surfaces for selective use by the emergency room medical team or ambulance paramedics attending the victim. From the first diagnosis or evaluation, the medical team can generally determine the nature of injury or sickness of the traumatized person and the nature of hospital emergency room procedures likely to be required. Thus, in the case of cardiac arrest, accident or other physical injury likely to require X-ray procedures, the victim will be immobilized on a first light transparent patient support panel having X-ray features. In cases such as heat stroke, burn, electric shock, chemical contamination or irradiation or the like, the victim will be immobilized on a second support panel of a fluid permeable and/or yieldable nature permitting irrigation and other treatment procedures, as will appear. At least one of the support surfaces can be moved into an angular relationship to position the immobilized patient "on his side" where nausea is or may become a factor.

Figure 1:
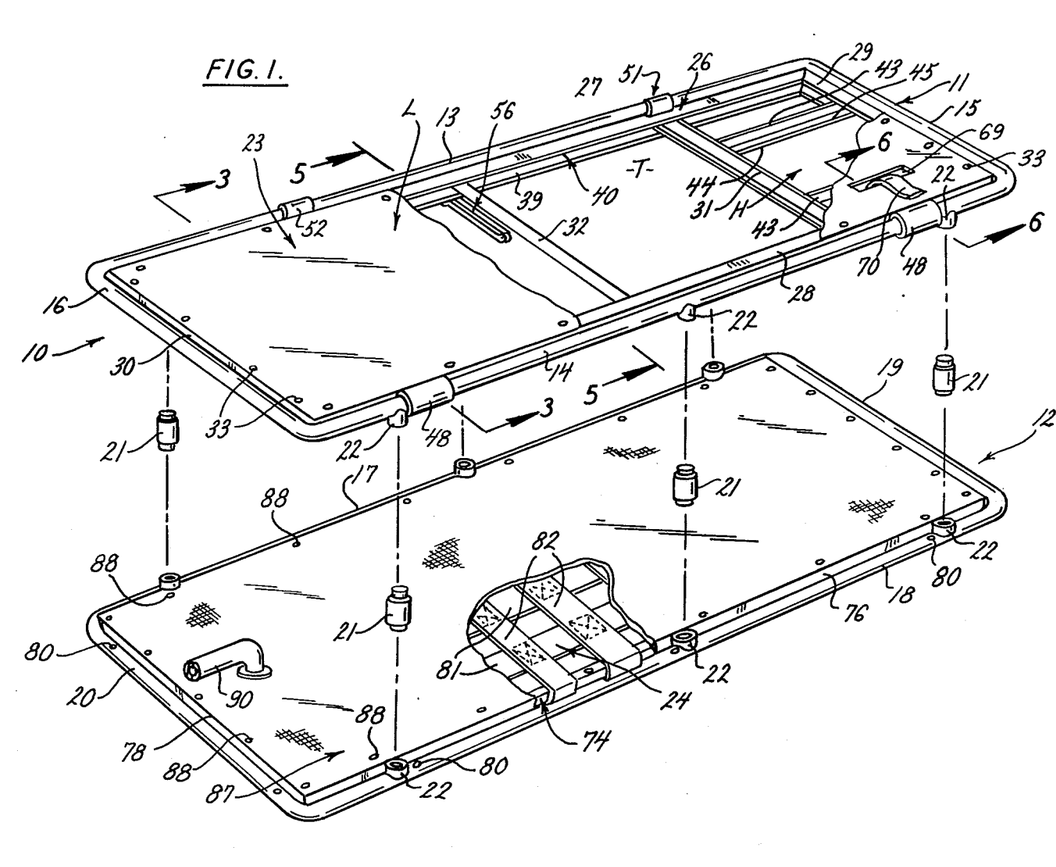
FIG. 1 is an exploded perspective view of an emergency trauma board embodying the invention, and showing an X-ray transparent panel in its upper patient support position and a fluid permeable panel in its lower position.

Referring now to the drawings, an emergency trauma board 10 embodying the invention comprises a first outer main frame 11 and a similar second outer main frame 12, both preferably being of tubular construction and having an elongated rectangular configuration. The first outer main frame 11 has longitudinal opposing side members 13 and 14 and end members 15 and 16 connected by rounded corners. The second outer main frame 12 has longitudinal opposing side members 17 and 18 and end members 19 and 20. In the preferred embodiment, these first and second outer main frames 11 and 12 are rigidly interconnected in parallel and horizontal spaced-apart relationship by a plurality of vertically extending spacer legs or posts 21 (as shown in the exploded view of FIG. 1). The posts 21 are suitably secured onto the side members of the main frames 11 and 12, as in opposed paired sockets 22 or the like. The interconnected outer main frames 11 and 12 provide the structural support for the entire trauma board apparatus 10, and are formed of a suitable strong, lightweight material, such as aluminum, and the spacer posts 21 are preferably formed of an electrically non-conductive material, such as wood or plastic, to provide electrical isolation between the two outer frames 11 and 12 to prevent grounding of the trauma board 10 during patient defibrillation. As shown in FIG. 1, the first or upper main frame 11 is provided with a rigid patient support panel 23 formed of clear or light transparent plastic material, such as LEXAN (a G.E. trademark) or other like material that is penetrable by X-rays, and the second or lower main frame 12 is provided with a yieldable patient support panel 24 formed of woven or webbed plastic material or the like that is fluid permeable, as will appear.

Referring to FIGS. 1, 3, 4 and 5, the first transparent panel 23 is mounted on an inner rectangular metal frame 26 having opposing longitudinal side members 27 and 28 and end members 29 and 30, and being sized to fit freely within the outer tubular frame 11. The inner frame 26 of the first panel 23 is also provided with transverse or cross frame members 31 and 32 strategically positioned beneath the panel 23 to provide structural support for the transparent panel 23 during CPR resusitation or the like. These cross frame members 31 and 32 are located in spaced relation intermediate of the end members 29 and 30 to define primary X-ray zones for head, torso and lower limb examination of a patient. Thus, the cross frame 31 is located at the shoulders of an adult person and with the end frame 29 defines a head and neck X-ray zone H; the cross frame 32 is positioned at the pelvis of an adult person and with the cross frame 31 defines a torso (chest and abdomen) X-ray zone T; and a lower limb X-ray zone L is defined between the cross frame 32 and end frame 30. In the preferred embodiment, the first panel 23 is secured around its peripheral edge to the inner frame members 27–30 by a plurality of suitable metal screw fasteners 33 or the like, and may also be secured to the cross frames 31 and 32. The members 29–32 thus extend perpendicularly to the transparent panel 23, and this inner frame 26 is arranged to selectively position X-ray film holders, as will now be described.

Figures 3, 4:
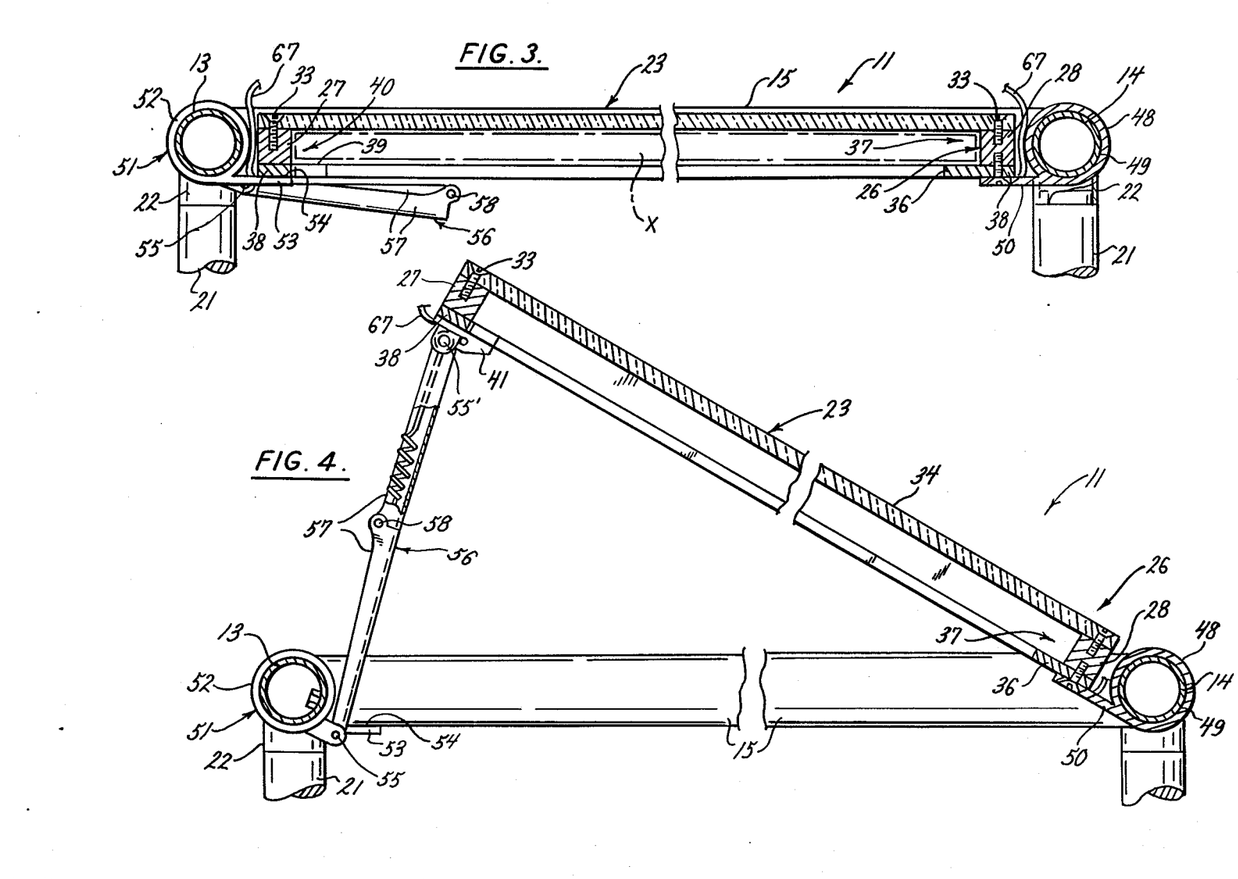
FIG. 3 is an enlarged fragmentary cross-sectional view taken substantially along line 3—3 of FIG. 1.
FIG. 4 is a similar view showing an open angular position of a patient support panel.
Figures 5, 6, 7:
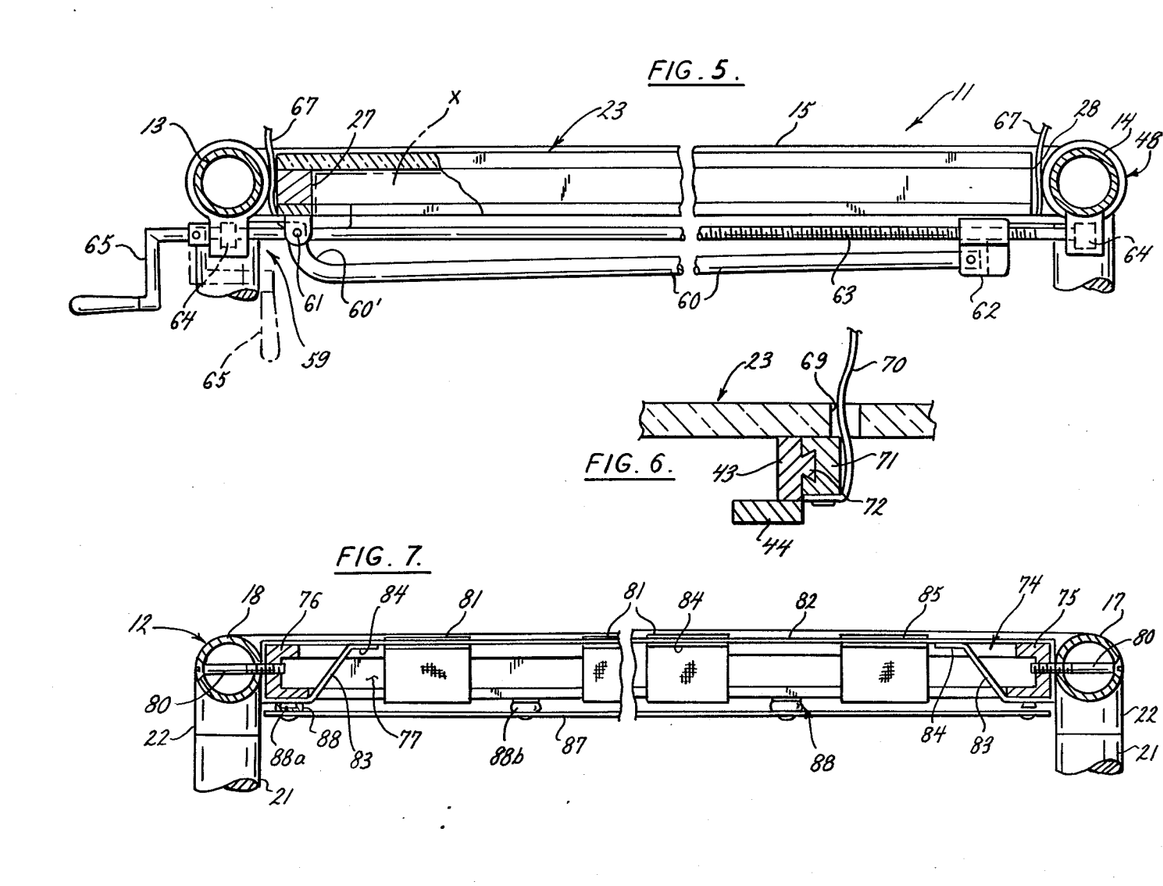
FIG. 5 is a view similar to FIG. 3, but taken along line 5—5 of FIG. 1 to illustrate an alternate bracing structure.
FIG. 6 is a greatly enlarged fragmentary cross-sectional view taken substantially along line 6—6 of FIG. 1.
FIG. 7 is a greatly enlarged fragmentary cross-sectional view taken substantially along line 7—7 of FIG. 2.

The transparent upper panel 23 is adapted for use as an emergency X-ray table, and includes an underlying positioner for X-ray file cassettes or holders X, as shown in phantom in FIGS. 3 and 5. The longitudinal side member 28 of the inner frame 26 has an inwardly projecting bottom flange or runner 36 secured thereto between the cross frames 31 and 32 and end frame 30 and in spaced relation to the first panel 23 to define elongated channel sections 37 extending along one side of the torso and lower limb zones T and L below the transparent panel 23 for receiving and supporting one edge of the X-ray film holder X on the flange 36. The opposite longitudinal side member 27 of the inner frame 26 is provided with a spacer rail 38, and a series of elongated side flanges or gates 39 extend inwardly toward the opposite side member flange 36 to define opposing elongated channels 40. The gate flanges 39 are hinged to the rail 38 with snap-action hinges 41 to permit downward hinging action of the gates 39 to open the channel 40 for receiving and positioning the X-ray cassette X beneath the panel 23. The lateral or transverse distance between the side rails or frames 27 and 28 of the inner frame 26, i.e. across the channels 37 and 40 is predetermined in order to accommodate a large, standard sized X-ray cassette conventionally used for taking torso X-ray plates and the like, although it should be noted that the X-ray zones T and L are longer than a conventional X-ray cassette and accommodate selective longitudinal positioning of these cassettes for a series of anterior/posterior X-ray plates without requiring any substantial movement of the patient. In taking head and neck X-rays a smaller standard sized X-ray cassette or plate holder is utilized to prevent the distortion that results when X-ray films of the head are taken on larger plates, as is well known. Accordingly, the head zone H of the inner frame 26 is provided with a pair of longitudinal rails or frame members 43 extending between the cross member 31 and end member 29 and being spaced apart to accommodate therebetween the small X-ray cassette used for head and neck X-ray plates. Inwardly projecting flanges 44 are provided at the bottom of these head zone rails 43 to support the side margins of such small cassette in opposing channels 45 (FIG. 6) or, alternatively, the cross and end members 31 and 29 may be flanged and gated as with the torso zone to provide opposing channels to removably receive head X-ray cassettes.

The first transparent panel 23 on its inner frame 26 is pivotally attached to the upper frame 11 for movement between a closed horizontal position (FIG. 3) and an angular or tilted position (FIG. 4) so that a patient can be effectively "rolled" onto one side to prevent gagging or provide for nausea occurring during emergency treatment. Thus, one longitudinal side (28) of the panel frame 26 is hingedly connected to the side frame piece 14 of the main frame 11 by at least two spaced sleeve hinges 48, each having a tubular body 49 encircling the tubular side member 14 and a mounting flange 50 secured to the lower flange 36 of the transparent panel inner frame 26. It will be apparent that the sleeve hinge 48 turns around on tubular side frame 14 in the embodiment shown in FIGS. 1, 3 and 4, but other hinging arrangements may be substituted to permit the panel 23 to turn or pivot relative to the main upper frame The opposed longitudinal side member 27 of the inner frame 26 for the transparent panel 23 normally rests on one or more abutment stop plates or ledge members 51 in its closed position. The stop plate 51 may also comprise a sleeve body 52 rigidly attached to the side frame 13, and a stop plate 53 projects inwardly therefrom to form an abutment ledge surface 54 for contact by the side member 27 or rail 38 of inner frame 26 in its normally closed horizontal position. It will be understood that the inwardly projecting stop plate 53 may be secured directly to the outer side member 13 in any suitable manner, and latching means (not shown) may be provided for locking the inner frame 26 in its closed position.

The hinging arrangement between the transparent panel frame 26 and first main frame 11 also includes bracing means for connecting and supporting the transparent panel 23 in its angular extended position relative to the main frame 11. In the embodiment of FIGS. 1, 3 and 4, a single foldable brace 56 is shown as the preferred structural support for the panel 23 in its open angular position, although a pair of such braces may be employed. The brace 56 comprises a bi-fold unit having a pair of spring-loaded over-center locking leg members 57, pivotally hinged together on pin 58, and having outer ends 55 and 55' pivotally secured to the tubular outer side frame 13 (or the stop plate 53) and to the inner frame side member 27 or spacer rail 38 thereon. As shown in FIG. 4, in the opened angular position of the panel 23, the brace leg members 57 snap into a locking straight line condition to rigidly brace the upper free side (27) of the first transparent panel 23 in spaced position above the main frame side piece 13. Thus, the bi-fold brace 56 has a predetermined length to position the first panel 23 at a preferred angle of about 30°–40° relative to the normally horizontal position of this panel 23 in the main frame 11. Referring to an alternate embodiment shown in FIG. 5, a mechanical gear drive and bracing structure 59 may be utilized for moving the transparent panel 23 into an angular open position. The simple bi-fold over-center brace 56 of FIGS. 3 and 4 provides a secure bracing structure in the open locked condition of the panel 23, but requires physical lifting of the panel 23 to unfold the brace leg members 57 to their extended locked condition of FIG. 4 which may be difficult with a large bodied patient being attended by emergency staff of smaller stature. Accordingly, the gear drive and bracing structure 59 (FIG. 5) provides a transverse lever arm and brace 60 having one end hinged to a pivot block 61 secured to the inner frame side member 27 or the like and its other end is hinged to slide block 62. The slide block 62 has internal worm gear teeth (not shown) threadedly carried on a pinion or worm gear spindle 63 journalled in bearing blocks 64 mounted on the main frame 11. A hand crank 65 rotates the pinion gear 63 to drive the slide block 62 transversely, which acts through the curved lever arm 60' of the brace 60 to raise the free side (27) of the inner frame 26 to a selected or variable raised angular position of up to about 45°–50° relative to the normal horizontal position, and securely holds the panel 23 in this selected position until the pinion gear 63 is reversely cranked. It will be readily apparent that the gear drive 59 provides a latched condition between the upper transparent panel 23 and outer main frame 11 in any open angular position as well as in the closed horizontal position of the panel 23. The crank 65 may be of the type that is disengageable from the pinion gear 63 and foldable downwardly or laterally into a remote and latched stored position indicated by broken lines in FIG. 5.

The upper transparent panel 23 of the present invention is also provided with patient restraint means for immobilizing a patient on the trauma board apparatus 10 during safe transportation and angular positioning. A plurality of transversely extending sets of flexible straps 67 are attached to the panel inner frame 26 in longitudinally spaced relation for securing the legs, torso and shoulders (chest) of the patient. These sets of webbing straps 67 or the like have their outer ends clamped to the side member flange 36 and spacer rail 38 by securing blocks 68, and the mating ends are provided with suitable adjustable and quick-release clamps (not shown) of well-known construction. Thus, it will be readily apparent that the mating sets of restraining straps 67 are preferably secured to the inner frame 26 and extend inside of the outer main frame 11 so as to encircle and immobilize a patient on the transparent panel 23 while permitting this panel to be freely moved between its normally closed and open angular positions. As shown in FIGS. 1 and 6, the transparent panel 23 is provided with spaced elongated slots 69 on each side of the underlying head rails 43 defining the head X-ray area H. These slots 69 accommodate a set of flexible head restraint straps 70 for use when necessary. The head straps 70 extend through the slots 69 and the lower ends are secured to slide blocks 71 that are held against the under surface of the panel 23, such as by keying (72) to the rails 43. Thus, the blocks 71 and straps 70 are slidable longitudinally in the slots 69 to adjust the head position of the straps.

Figure 2:
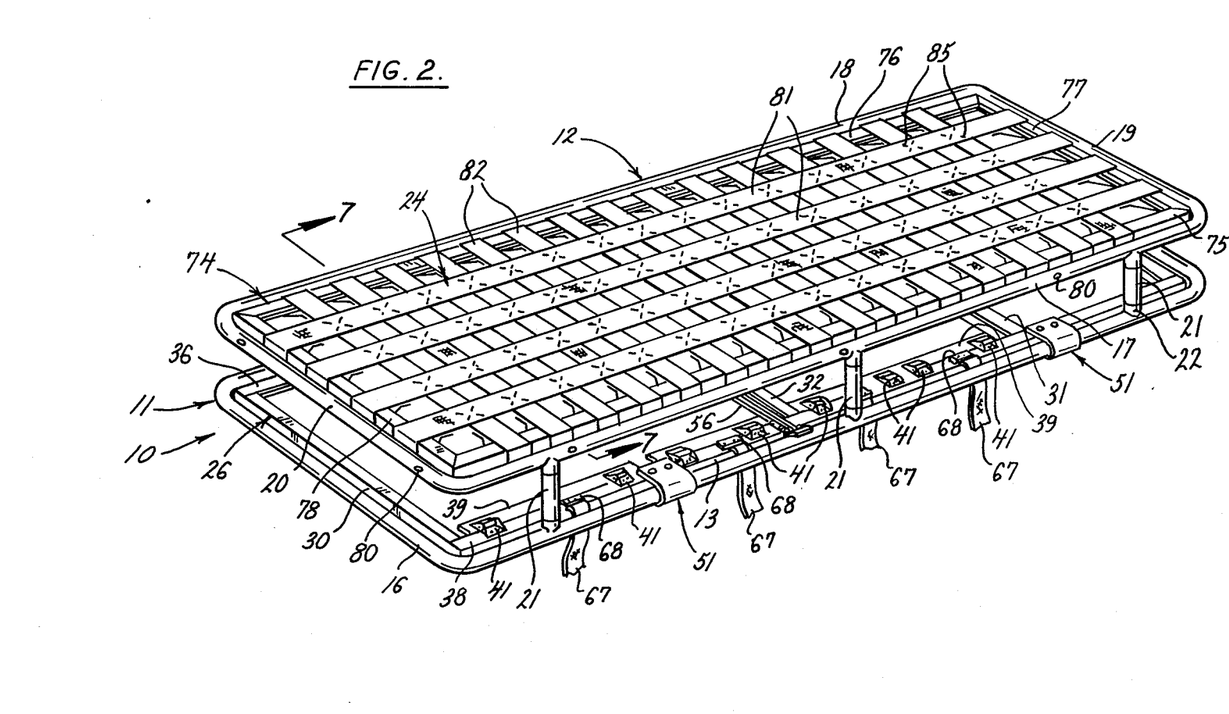
FIG. 2 is another perspective view of the inventive trauma board in inverted position to show the fluid permeable patient support panel in its upper patient support position.

Referring now to FIGS. 1, 2 and 7, the second fluid permeable patient support panel 24 is mounted on an inner rectangular frame 74 having opposed longitudinal side members 75 and 76 and end members 77 and 78, and being sized to fit closely within the outer main frame 12. The inner frame 74 of the lower or second support panel 24 is removably secured to the second outer main frame 12 by a plurality of drawbolts 80 or the like to rigidly hold these outer and inner frames 12 and 74 in fixed position. In the preferred embodiment, the patient support surface of the fluid permeable or porous panel 24 comprises a plurality of laterally spaced and longitudinally extending flexible straps 81 extending around the inner frame end members 77 and 78 and a plurality of longitudinally spaced and transversely extending flexible straps 82 extending around the opposed side members 75 and 76. The main runners of the straps 81 and 82 are drawn taut between their respective frame members, and the end portions 83 of the straps preferably are drawn around the frame members and releasably secured to the under surface of the main runners, at 84, as by VELCRO (not shown). The cross areas 85 of the longitudinal and transverse straps 81 and 82 may also be secured together by stitching or VELCRO to maintain a fixed spaced relationship between the straps intermediate their end portions 83. Although other end fastening means may be provided for the main runners, it is preferable that the entire panel 24 can be removed from its inner frame 74 for replacement following certain emergency procedures involving irrigation for chemical contamination. It will also be understood that the inner frame 74 and webbed panel 24 may be molded from a strong lightweight plastic material as an integral unit that may be removed from the outer frame 12 for cleaning or replacement.

The essential feature of the panel 24 is that it is formed as an open lattice or perforate surface to firmly yet yieldingly support the patient and also provide optimum air circulation or ventilation to the patient as well as accommodate the free passage of cleansing fluid therethrough as during chemical decontamination procedures. For this purpose, an imperforate fluid barrier in the form of a rubberized sheet or like tarpaulin 87 is provided to underlie the panel 24 to capture the effluent used for chemical decontamination or like washing. The tarpaulin 87 is removably attached below the panel 24 by peripherally disposed heavy-duty snap fasteners 88. In the preferred embodiment, the mating male snap members 88a are mounted on the inner frame side and end members 75–78, although they may be mounted on the straps 81 and 82 at or adjacent to the inner frame 74 or even on the outer main frame 12. The tarpaulin 87 is also provided with a plastic drain pipe 90 or the like for connection to a hose (not shown) for disposing of the effluent caught by the tarpaulin 87 during cleansing procedures.

It will now be apparent that the trauma board of the present invention is useful in the transportation and handling of all types of accident, injury or sickness cases through hospital E.R. procedures. The first, transparent panel 23 provides a rigid patient support surface on which an accident, injury, heart attack or like victim can be immobilized, and provides emergency X-ray examination capability during such immobilization as well as movement of the patient to an angular position to treat nausea. The second, fluid permeable panel 24 provides a firm, yieldable patient support surface on which victims of certain types of accidents, burn, chemical or electrical irradiation, etc. can be supported with minimum body contact, and provides for fluid passage around the patient's body including air ventilation for cooling and chemical irrigation or the like for cleansing. It should be noted that no restraining straps are specifically provided on this second panel 24, but it should be understood that the straps 67 of the first panel 23 can be brought upwardly (FIG. 2) and used for patient restraint on panel 24, if needed.

The construction and operation of the preferred embodiments of the present invention are believed clear from the foregoing description, which encompasses all changes and modifications thereto as will be readily apparent to all skilled in the art whereby the invention is only limited by the scope of the appended claims.

What is claimed is:

1. An emergency trauma board for handling trauma victims during emergency transfer, diagnosis and treatment, comprising a first light transparent panel having a first patient support surface and means for positioning X-ray plates on the underside thereof, a first main frame for said first panel, a second fluid permeable panel having a second patient support surface, a second main frame for said second panel, and means interconnecting said first and second frames in substantially parallel spaced relationship with said patient support surfaces normally being in horizontal extending and spaced position relative to each other.

2. The trauma board according to claim 1, in which said interconnecting means for said main frames comprise a plurality of post members extending normal to the spaced planes of said support surfaces.

3. The trauma board according to claim 2, in which said post members are electrically non-conductive to provide electrical isolation between said first and second main frames and the patient support panels thereof.

4. The trauma board according to claim 1, including other means for moving one of said panels to position its support surface angularly relative to the normal horizontal position thereof.

5. The trauma board according to claim 4, in which said first panel is mounted on a first inner frame, and said other means comprises hinge means connecting one side of said first inner frame to one side of said first main frame to accommodate hinging movement of said first panel on said first main frame.

6. The trauma board according to claim 5, in which the other side of said inner frame opposite to said hinged one side thereof is movable toward and away from the corresponding other side of said first main frame, and means delimiting a normally closed, parallel plane position and an extended angular position of said first panel relative to said first main frame.

7. The trauma board according to claim 6, in which said delimiting means includes an abutment stop plate secured to said other side of said first main frame and projecting inwardly toward said opposed one side thereof, and said other side of said first inner frame being engageable against said stop plate in the normally closed position thereof.

8. The trauma board according to claim 7, including latching means for securing said other side of said first inner frame member in abutment with said stop member in the normally closed position thereto .

9. The trauma board according to claim 6, in which said delineating means includes bracing means extending between said other sides of said first inner frame and first main frame and being releasably lockable to maintain the extended angular position of said first panel.

10. The trauma board according to claim 6, in which said delimiting means comprises gear drive and bracing means having a transversely extending auger gear spindle journalled for rotation on said first main frame, a transverse brace having one end hinged to said other side of the first inner frame and its other end being operatively driven by said gear spindle, and means for rotating said gear spindle to selectively move said other brace end transversely of said first main frame to actuate said other side of said first inner frame between said normally closed and extended angular positions.

11. The trauma board according to claim 1, in which said first panel is formed of X-ray penetrable material and has head, torso and leg zones extending from head end to foot end, said X-ray plate positioning means comprising plate engaging means including first means constructed and arranged in said head zone to accommodate and support an X-ray film holder of a predetermined size, and second means constructed and arranged longitudinally along opposed sides from said head zone to said foot end of said first panel to accommodate and support an X-ray film holder of a different predetermined size between said sides in said torso and leg zones.

12. The trauma board according to claim 1, in which said first panel is secured to an elongated first inner frame mounted on said first main frame, said first inner frame having longitudinal side members, and said X-ray positioning means comprising first oppositely opening, elongated channel means formed along said side members below said first panel for mounting X-ray film holders at different longitudinally selected positions.

13. The trauma board according to claim 12, in which said first channel means along one side member of said first inner frame comprises a longitudinal channel extending a substantial distance intermediate the ends of said first panel and having a fixed lower channel flange for supporting one edge of an X-ray film holder at a selected longitudinal position adapted for taking torso X-ray plates from the neck through the pelvic regions.

14. The trauma board according to claim 13, in which said first channel means along the other side member opposite to said one side member comprises hinged gate means for supporting another edge of an X-ray film holder in the closed, channel forming position thereof, said hinged gate means being movable to an open position for inserting and removing X-ray film holders into and from said opposed channel forming means.

15. The trauma board according to claim 12, in which said X-ray positioning means includes second oppositely opening channel means constructed and arranged adjacent to one end of said first inner frame and intermediate of the side members thereof for supporting X-ray film holders in position for taking head and neck X-ray plates.

16. The trauma board according to claim 1, including patient restraint means constructed and arranged for selectively immobilizing a trauma patient on the patient support surface of at least one of said first or second panels.

17. The trauma board according to claim 1, in which said patient restraint means comprises at least one set of flexible head straps constructed and arranged for immobilization of a patient's head.

18. The trauma board according to claim 17, in which said transparent panel has a head placement zone for X-ray examination of a patient's head, a pair of spaced slots in said transparent panel on each side of said head placement zone to receive said flexible head straps therethrough, and slidable means for retaining the ends of said head straps below said transparent panel to accommodate longitudinal adjustment of said head straps.

19. The trauma board according to claim 16, in which said first panel is mounted to a first inner frame hingedly mounted on one side to said first main frame, the other side of said first inner frame being movable toward and away from said first main frame, and said restraint means comprising opposed sets of flexible straps for the body torso and extremities, each such set having outer ends secured to opposed sides of said first inner frame and inner ends releasably and adjustably engageable for body encircling engagement with a patient on said first panel.

20. The trauma board according to claim 19, in which said first panel is adapted for selective movement between a normal horizontal position and a raised angular position relative to said first and second main frames and wherein said patient restraint means is constructed and arranged for patient restraining engagement to accommodate said selective movement of said first panel without releasing or repositioning the patient.

21. The trauma board according to claim 19, in which said restraint straps for said torso and extremities are connected below the opposed sides of said first panel and are adapted to be selectively placed either around said first panel or around said main frames and second panel in patient encircling engagement.

22. The trauma board according to claim 1, in which said second panel is mounted on a second inner frame constructed and arranged to be removably secured to said second main frame, said patient support surface of said second panel having an open lattice to provide for air circulation and accommodate chemical irrigation.

23. The trauma board according to claim 22, in which said second panel comprises an open webbing of spaced longitudinal and transverse flexible straps peripherally stretched across said second inner frame, one of said straps and said second inner frame being removable from said second main frame for cleaning or replacement of said second panel.

24. The trauma board according to claim 22, which includes a fluid impermeable barrier means removably disposed in a subjacent position below said second panel for trapping irrigation fluids for disposal.

25. The trauma board according to claim 24, in which said barrier means comprises a flexible waterproof sheet, and fastening means for removably securing said barrier means to one of said second or main frames.

26. The trauma board according to claim 24, in which said barrier means comprises a tarpaulin, and fastening means for releasably securing said tarpaulin to said second inner frame.

27. The trauma board according to claim 24, including drain means constructed and arranged on said barrier means at the lowest point thereof for fluid disposal.

28. The trauma board according to claim 1, in which the parallel horizontally spaced planes of said first and second patient support surfaces are constructed and arranged within the outer spaced marginal edges of said first and second main frames whereby said trauma board is carried entirely on one of said main frames in selectively using either of said patient support surfaces.

29. The trauma board of claim 1, in which said first and second panels are mounted in opposed spaced relation on said first and second main frames, one of said patient support surfaces of said panels being disposed in an operative, upwardly facing, patient supporting position and the other of said surfaces facing downwardly in an inoperative position, said trauma board being reversible for selectively placing either of said patient support surfaces in the operative, upwardly facing, patient supporting position.

30. An emergency trauma board for handling trauma victims during emergency transfer, diagnosis and treatment, comprising a first light transparent panel having a first patient support surface and means for positioning X-ray plates on the underside thereof, a first main frame for said first panel, a second fluid permeable panel having a second patient support surface, a second main frame for said second panel, means interconnecting said first and second main frame in substantially parallel spaced relation with said patient support surfaces normally being disposed in substantially parallel and horizontally extending planes, restraining means for releasably immobilizing a patient on at least one of said first and second panels, and other means for moving one of said panels to position its support surface angularly relative to the normal horizontal plane thereof.

31. An emergency trauma board for handling trauma victims during emergency transfer, diagnosis and treatment, comprising a first light transparent panel having a first patient support surface and means for selectively positioning X-ray plates on the underside thereof, a first main frame for said first panel, a second fluid permeable panel having a second patient support surface, a second main frame for said second panel, means interconnecting said first and second main frames in substantially parallel spaced relation with said patient support surfaces normally being disposed in substantially parallel and horizontally extending planes, means for moving one of said panels to position its support surface angularly relative to the normal horizontal plane thereof, restraining means for releasably immobilizing a patient on at least one of said first and second panels, said second panel comprising an open lattice to provide for air circulation and accommodate chemical irrigation, and said second panel including fluid impermeable barrier means removably disposed in an underlying position to said open lattice for entrapping irrigation fluids, and drain means connected to said barrier means for disposing of trapped irrigation fluids.

* * * * *

UNITED STATES PATENT AND TRADEMARK OFFICE
CERTIFICATE OF CORRECTION

PATENT NO. : 4,947,418

DATED : August 7, 1990

INVENTOR(S) : Stephen J. Barr and Melody T. Barr

It is certified that error appears in the above-identified patent and that said Letters Patent is hereby corrected as shown below:

Column 3, line 20, "gencY" should be --gency--.

Column 8, line 49 (line 4 of claim 8), "thereto" should be --thereof--.

Column 9, line 47 (line 1 of claim 17), "claim 1" should be --claim 16--.

Signed and Sealed this

Twenty-seventh Day of August, 1991

Attest:

HARRY F. MANBECK, JR.

Attesting Officer

Commissioner of Patents and Trademarks